United States Patent
Peters (10) Patent No.: US 7,707,399 B2
(45) Date of Patent: Apr. 27, 2010

(54) ADJUSTING DEPICTION OF USER INTERFACE BASED UPON STATE

(75) Inventor: Geoffrey W. Peters, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1769 days.

(21) Appl. No.: 10/830,742

(22) Filed: Apr. 23, 2004

(65) Prior Publication Data

US 2005/0240983 A1  Oct. 27, 2005

(51) Int. Cl.
*G06F 9/00* (2006.01)

(52) U.S. Cl. .......................... 713/1; 713/100

(58) Field of Classification Search ............. 713/1, 713/100
See application file for complete search history.

(56) References Cited

U.S. PATENT DOCUMENTS 6,346,933 B1 * 2/2002 Lin ........................... 345/157
6,788,412 B2 * 9/2004 Pfister ....................... 356/402

* cited by examiner

*Primary Examiner*—Thomas R Peeso
(74) *Attorney, Agent, or Firm*—Schwabe, Williamson & Wyatt, P.C.

(57) ABSTRACT

Embodiments of the present invention provide adjustments of the depiction of a user interface upon a computing environment's change in state.

13 Claims, 8 Drawing Sheets

ADJUSTING DEPICTION OF USER INTERFACE BASED UPON STATE

FIELD OF THE INVENTION

The present invention relates generally to the field of electronic computing, more specifically, to end-user interfaces.

BACKGROUND OF THE INVENTION

As computing environments have become more complex, to some, the divisions between processors and applications have become blurred. Additionally, the delineation between processors has become weak, for example with remote applications rendering locally. The blurring is further compounded by technologies such as virtual machines.

It is beneficial to establish useful states in a computing environment that are separate from an application-centric interface. However, placing the computing environment in a designated state should not require a user to change the state with each application in the computing environment. Instead, a global state change (across applications, virtual machines, and so forth) should be possible.

Another limitation of conventional user interfaces is that computing environment state information is not shared in an unobtrusive manner.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, a tinge renderer that reveals state information about a host computer.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Further, various operations and/or communications will be described as multiple discrete operations and/or communications, in turn, in a manner that is most helpful in understanding the present invention; however, the order of description should not be construed as to imply that these operations and/or communications are necessarily order dependent. In particular, these operations and/or communications need not be performed in the order of presentation.

The phrase "in one embodiment" is used repeatedly. The phrase generally does not refer to the same embodiment; however, it may. The terms "comprising," "having" and "including" are synonymous, unless the context dictates otherwise.

Embodiments of the present invention define an architecture that allows a particular state to be indicated across a part of, or an entire computing environment. In one exemplary embodiment, a user may present a key (e.g., a digital encryption key) that the user activates in a computer. When the user activates the key, a part of, or the entire user interface of the computing environment takes on a slight, but easily discernable, color tinge. This notifies the user that all work while in this mode will be done with secure transmissions and protection. For instance, printing a document will embed a watermark, browsing the web will all be done via HTTPS, saving a file will encrypt the file, sending an email will send the email securely, and the like. Those of ordinary skill in the art and others will appreciate that other types of states may be imposed and that a secure state (and the listed actions) is merely an example of one embodiment of the present invention. By using the tingeing of an entire display, the user can quickly grasp cross application states demonstrably.

Figure 1:
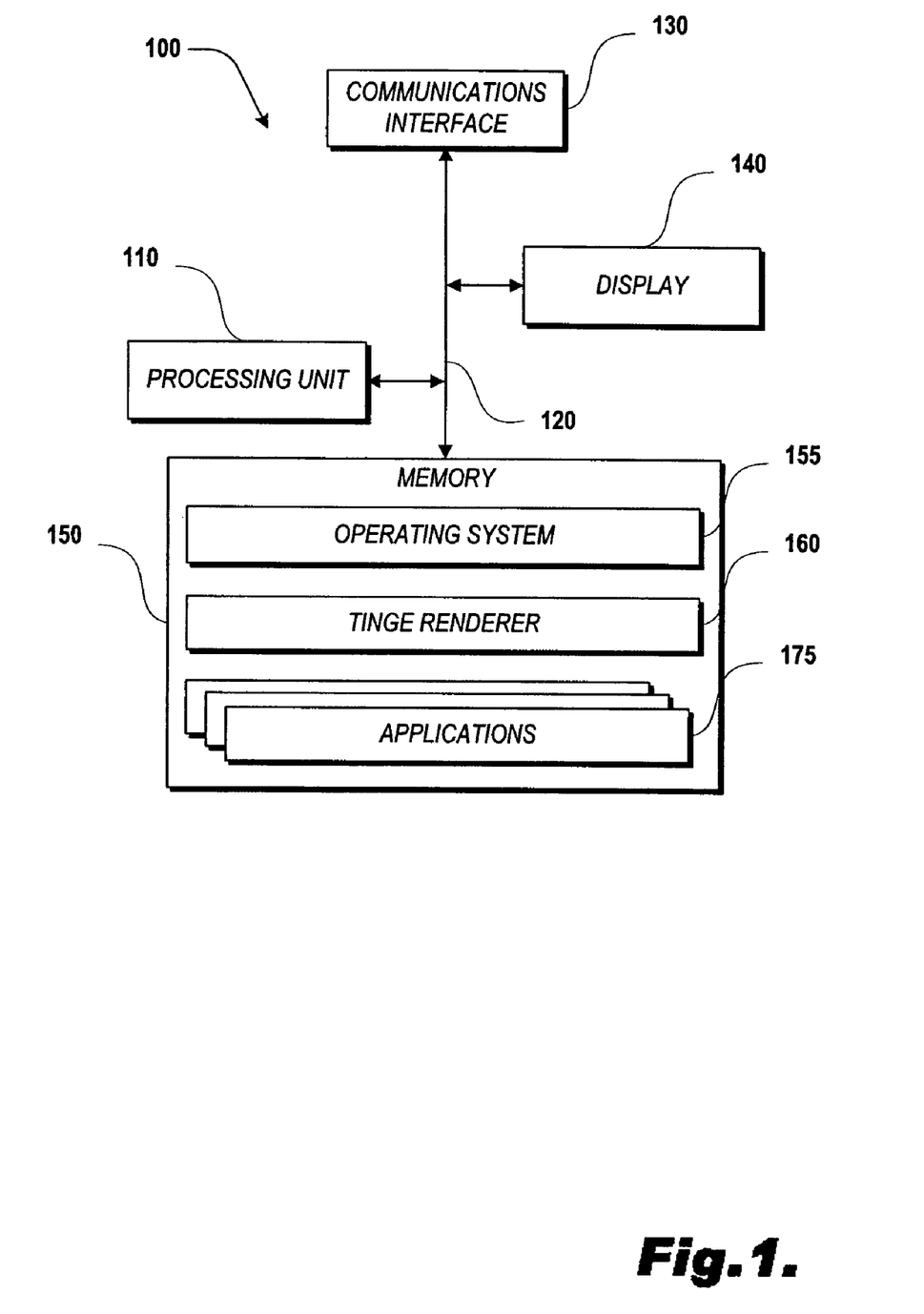
FIG. 1 illustrates a block diagram view of a computing environment, in accordance with an embodiment of the present invention.

FIG. 1 illustrates an exemplary computer 100 suitable for use in embodiments of the present invention. Those of ordinary skill in the art and others will appreciate that the computer 100 may include many more components than those shown in FIG. 1. However, it is not necessary that all of these generally conventional components be shown in order to disclose an enabling embodiment for practicing the present invention. As shown in FIG. 1, the computer 100 includes an optional communications interface 130 for connecting to remote device(s) (not shown). Communications interface 130 includes the necessary circuitry, driver and/or transceiver for such a connection and is constructed for use with the appropriate protocols for such a connection.

The computer 100 also includes a processing unit 110, a display 140 and a memory 150, all interconnected along with the communications interface 130 via a bus 120. The memory 150 generally comprises random access memory ("RAM"), a read only memory ("ROM") and a permanent mass storage device, such as a disk drive, flash RAM, or the like. The memory 150 stores an operating system 155 and a tinge renderer 160 formed in accordance with embodiments of the present invention. In various embodiments, memory 150 also stores applications 175. It will be appreciated by those of ordinary skill in the art and others, that while the tinge renderer 160 and applications 175 are described as separate individual software components, they may actually be combined, comprised of multiple software components; or may in fact be sub-parts of one or more integrated software components. In particular, tinge renderer 160 may be integrated with applications 175 or operating system 155. Additionally, while the tinge renderer 160 is illustrated as a software component (e.g. part of the operating system, or a discrete application), in alternate embodiments the tinge renderer 160 may be a hardware component of the computer 100.

It will be appreciated that the software components may be loaded from a computer readable medium into memory 150 of the host computer 100 using a drive mechanism (not shown) or network mechanism (not shown) associated with the computer readable medium, such as a floppy, tape, DVD/CD-ROM drive, flash RAM, network interface card, or communications interface 130.

Figure 2:
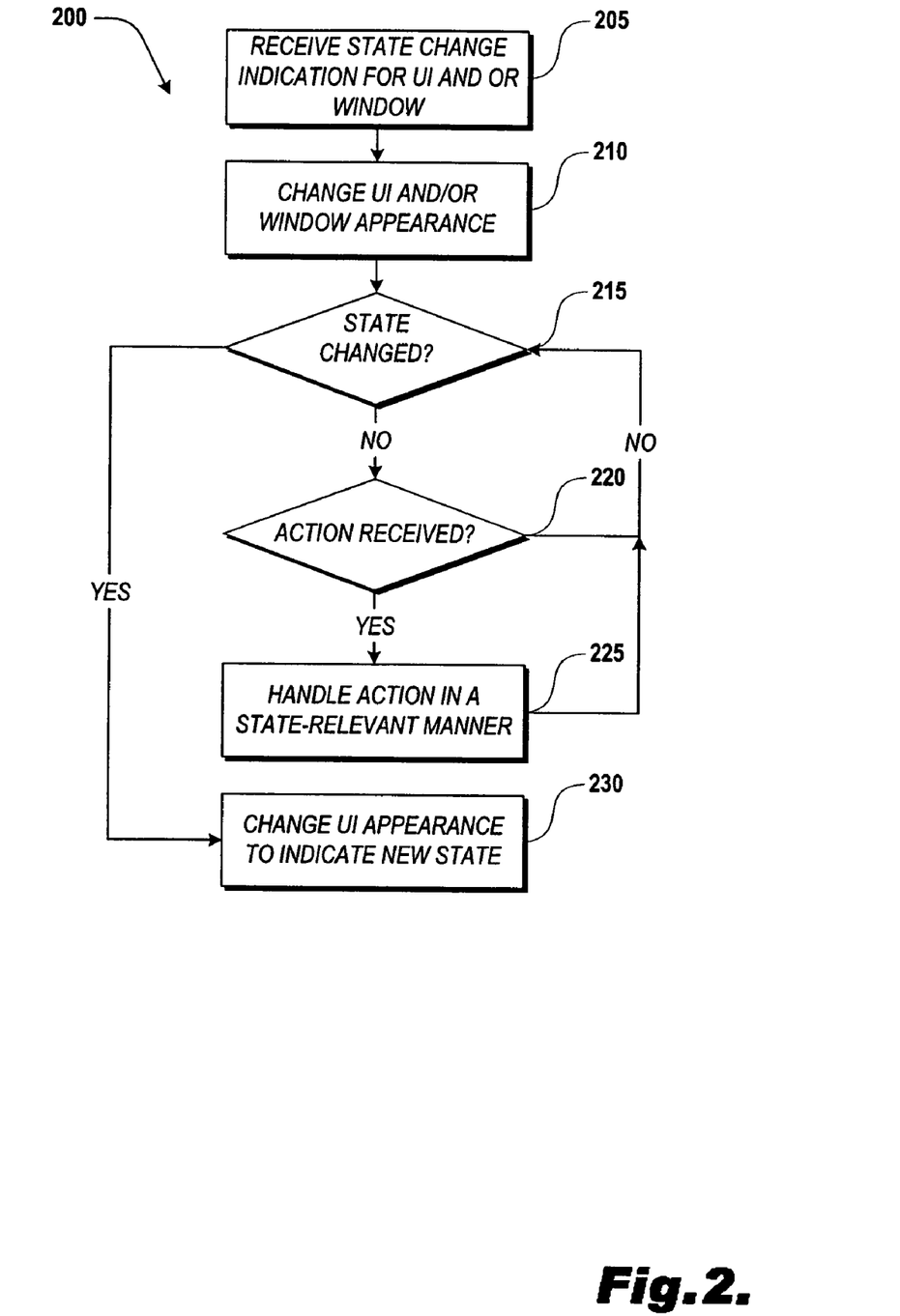
FIG. 2 illustrates a flow diagram of a state change indication routine, in accordance with one embodiment of the present invention.

FIG. 2 is a flow chart illustrating actions of one exemplary embodiment of the present invention where state changes are illustrated in a user interface and/or individual windows of applications in a user interface. Note that embodiments of the present invention are directed to illustrating and/or depicting to a user that a particular state exists. The behavior induced or specified by such an illustrated and/or depicted state is beyond the scope of the present invention. The state depiction routine 200 shown in FIG. 2 begins at block 205 where a change in state is received for indication in the user interface and/or application windows. In block 210 the user interface and/or window appearances are changed to reflect the new state. Those of ordinary skill in the art and others will appreciate that many possible appearance changes may be used to indicate a changed state. Embodiments of the present invention are directed toward any number of possible appearance changes however one exemplary listing would include color tingeing the user interface and/or application windows such that specific colors would represent distinct states. Those of ordinary skill in the art will also appreciate that the color tingeing may span across the whole user interface and/or across windows or may simply affect specific regions of a user interface and/or application windows. For example, only one or more borders of a user interface and/or application windows may be changed in appearance to indicate a state change. Other possible appearance changes may involve gradations in color and/or transparency of a user interface and/or application windows, shading with patterns across a user interface and/or application windows, border shape changes in application windows, increased depth to window and or window border appearances, and the like.

In one exemplary embodiment where a tinge is applied to the whole user interface, upon the appearance change (application of the tinge) the tinge renderer 160 in conjunction with the operating system 155 copies and saves the pixel values corresponding to the whole user interface display to a first buffer (not shown). Thereafter, the tinge renderer 160 blends the copied pixel values with the pixel values of the tinge to be applied (stored e.g. in a second buffer (also not shown)), to generate a new set of pixel values representing the tinged content. The blending is performed in accordance with a current tingeing setting ($\alpha$). That is, the tinged content equals ($\alpha \times p1$)+(($1-\alpha$)$\times p2$), where p1 represents the pixel values of the whole user interface, and p2 represents the pixel values of the current tinge. The operation is known as alpha-blending.

Those of ordinary skill in the art and others will appreciate that alpha-blending is only one type of tingeing and that other methods of tingeing may be employed by various embodiments of the present invention. In embodiments of the present invention using color-filled windows and user interface components, a color tinge may be applied by the tinge renderer 160 at the color settings level (i.e., adjusting RGB values of a fill color) of the color-filled windows and user interface components (e.g., at the Microsoft® Windows'® "appearance" settings). The above examples are merely illustrative and are not meant to be limiting to either the spirit or scope of the present invention.

The state change indication routine 200 next continues to decision block 215 where a determination is made whether the current state has been changed. If the current state has not been changed, processing continues to decision block 220 where a determination is made whether an action has been received. If an action was not received, processing loops back to decision block 215. If, however, an action was determined to have been received in decision block 220, processing continues to block 225 where the action is handled in a state relevant manner 225. If in decision block 215 it was determined that the current state has been changed, processing continues to block 230 where the user interface and/or window appearances are changed to reflect the new state.

In embodiments of the present invention it is possible to illustrate/depict various states and that those states may handle actions in a state relevant manner in a number of different ways. Those of ordinary skill in the art will appreciate that the following examples are merely illustrative and are not meant to be limiting.

In one exemplary embodiment the state change is a change to a "secure" state such that all actions in the user interface and/or application windows should be handled in a secure manner. Handling actions in a secure manner is often application dependent, however those of ordinary skill in the art and others will appreciate that there are generally accepted understandings of relative differences between secure and insecure actions in a computing environment. For example, a conventional email communication would not necessarily involve either encryption or authentication of an email message. However, in a secure state an email application could increase the relative "security" of the email communications it sends by encrypting, authenticating or both encrypting and authenticating messages that it sends. Similarly, an application that stores a file normally uses an unencrypted save routine wherein files are saved in an unencrypted format. In a secure state, applications that save files may be required to store them in an encrypted manner or to a "secure" location. Those of ordinary skill in the art and others will appreciate that other applications can behave in a "secure" manner that is appropriate to their specific actions.

Those of ordinary skill in the art and others will also appreciate that other states may be applied, other than secure states. For example, a user may specify a low power state such that the operating environment and/or applications in the operating environment will use less power intensive activities while in the low power state. In such a state, an application may only store incremental differences when periodically backing up working documents instead of completely storing a back-up copy of a current file. Other examples of a low power state may involve refreshing graphical images less frequently and/or performing computations in a manner that does not require memory to be swapped to the hard drive, thereby increasing the use of mechanical functions of the computer that utilize more memory than internal memory function.

Once an action has been handled in a state relevant manner, the state indicating subroutine 200 proceeds back to decision block 215. If, in decision block 215, it is determined that a state change has occurred, then processing continues to block 210 where the user interface and/or window appearances is changed yet again. Those of ordinary skill in the art and others will appreciate that the examples listed above are illustrative and are not meant to be limiting on the possible types of state changes, actions and/or state relevant manners of handling actions.

In another embodiment of the present invention a user is running a computer with multiple virtual machines or separate processing cores (hereinafter, different computing environments). When switching between the computing environments (virtual or real), the tinge of the window or entire displays automatically changes based on the processor processing the currently displayed application(s). For instance, with an exemplary multiple virtual machine embodiment, some applications may be running on a "stable" environment (stable processor and/or operating system, and so forth), and these applications appear with a green tinge. All applications that run on a less stable environment (one or more newly installed/updated processor, and/or operating system, and so forth), will display in windows that have a slight red tinge to them.

Figure 3:
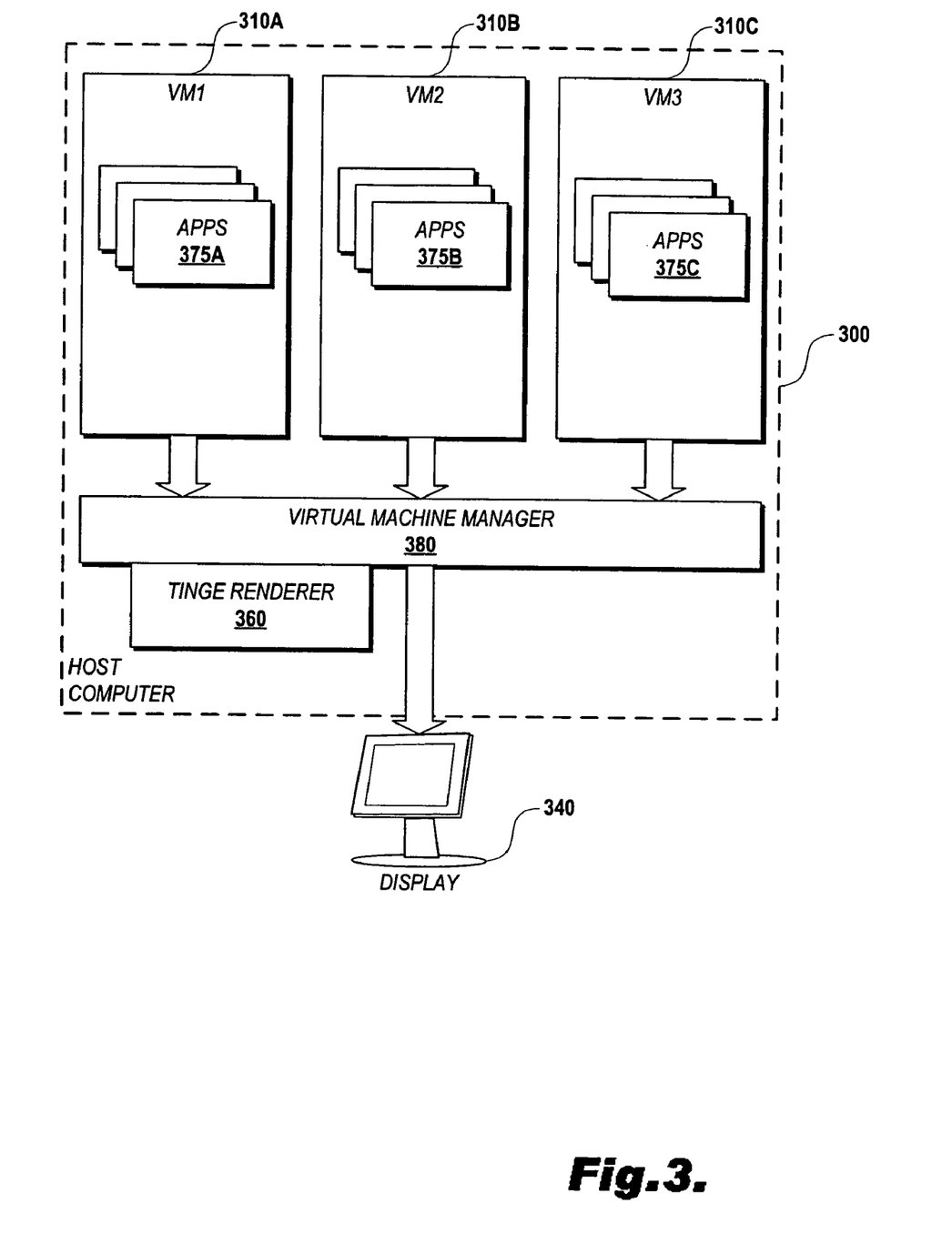
FIG. 3 illustrates a block diagram view of a computing environment with multiple virtual machines, in accordance with an embodiment of the present invention.

FIG. 3 illustrates an exemplary computing device with multiple computing environments suitable for use in the present invention. Those of ordinary skill in the art and others will appreciate that the computing device 300 may include many more components than those shown in FIG. 3. However, it is not necessary that all these generally conventional components be shown in order to disclose an enabling embodiment for practicing the present invention. As shown in FIG. 3, the computing device 300 includes multiple virtual machines 310A-C (running one or more processors) each having its own set of applications 375A-C. Also included is a virtual machine manager 380 that is operatively coupled to each of the virtual machines 310A-C along with a tinge renderer 360. The tinge renderer 360 operates in combination with the virtual machine manager 380 to render the displays for the operating environments of the virtual machines 310A-C (including displays of their respective applications 375A-C) in a display device 340. Either or both virtual machine manager 380 and tinge renderer 360 may be a hardware component or a software component. Further, as with the embodiment of FIGS. 1-2, virtual machine manager 380 and tinge renderer 360 may be combined. Those of ordinary skill in the art and others will appreciate that, while three virtual machines 310A-C are illustrated and only a single display device 340 is illustrated, other numbers of virtual machines and/or display devices may be employed in various embodiments of the present invention. Additionally, the computing device 300 of FIG. 3 may include similar components to those of computing device 100, illustrated in FIG. 1 and described above.

In an alternate embodiment the virtual machines 310A-C are actually separate processing cores. Accordingly, FIGS. 3 and 4 apply equally to a computing environment where processing cores are substituted for virtual machines.

Figure 4:
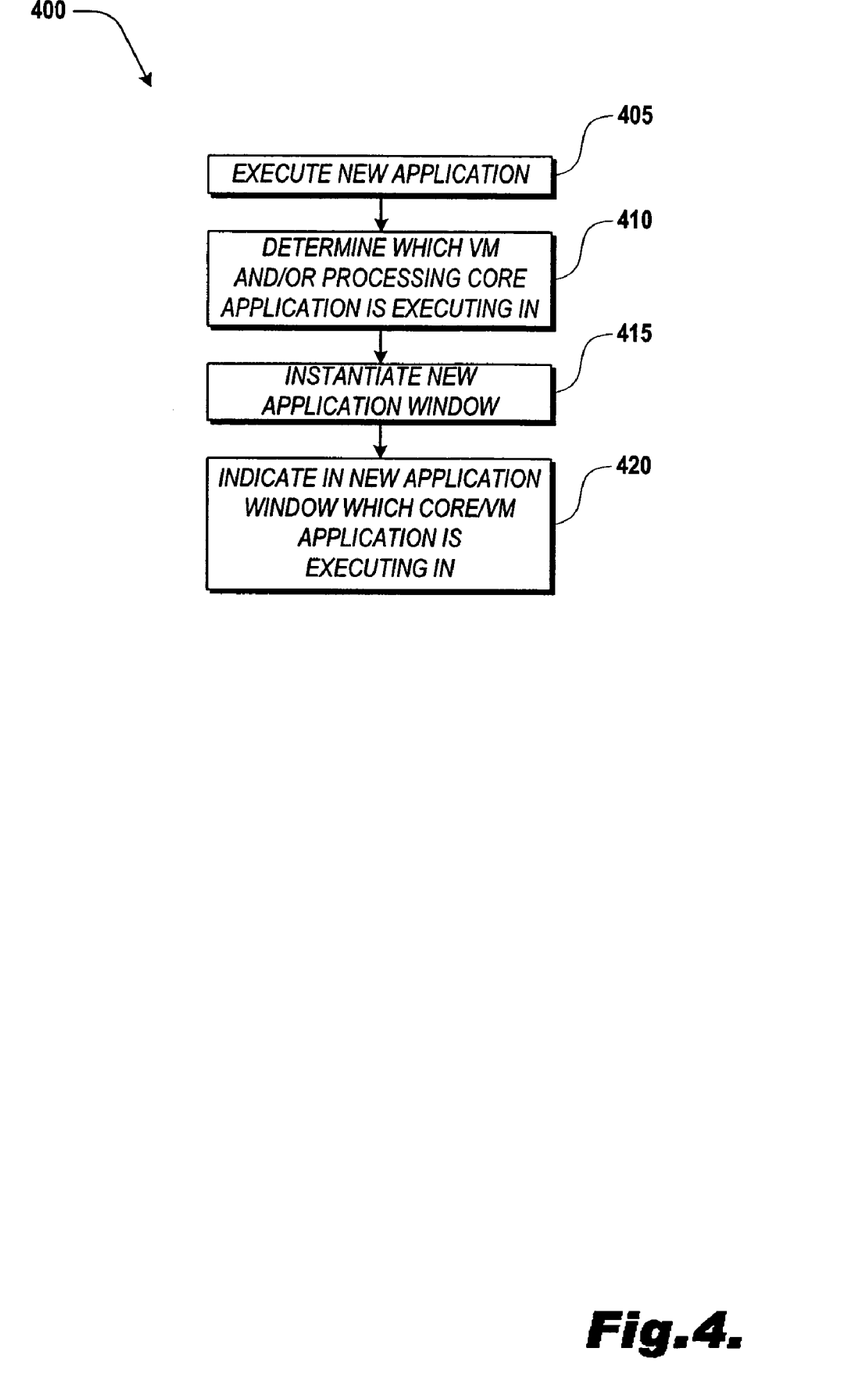
FIG. 4 illustrates a flow diagram of a virtual machine indication routine, in accordance with embodiments of the present invention.

FIG. 4 depicts a flow chart illustrating actions of an exemplary embodiment of the present invention where application windows indicate which virtual machine they are operating in with specific appearance changes. Tinge renderer 360 and virtual machine manager 380 automatically tinge application windows to indicate which virtual machine 3210A-C they are operating in. An exemplary operation flow 400 of tinge renderer 360 and virtual machine manager 380 begins at block 405 where a new application is executed in a virtual machine. In block 410, as new application instantiates its output window, a determination is made (e.g., within the application) by tinge renderer 360 and/or virtual machine manager 380, which virtual machine (or similar distinct operating environment such as a separate determination of which processing core) an application is executing in. Next, in block 415, the new application window is instantiated by the tinge renderer 360 and the virtual machine manager 380. In block 420, tinge renderer 360 indicates, in the application window, which virtual machine (or processing core) the application is executing in. Those of ordinary skill in the art and others will appreciate that any number of indications may be used to indicate which virtual machine a particular application and its window are operating in. In one exemplary embodiment, separate colors are designated for each virtual machine (or processing core) and a corresponding color tinge is applied to windows of applications operating in these virtual machines. Such an embodiment may be implemented in the underlying device abstraction layer, thereby requiring no application or operating system modification in order to support this tingeing. Those of ordinary skill in the art and others will appreciate that still further indications may be used, for example text within a border region of each application window, the shape and/or texture of the application window and/or application window border, and the like. Actual embodiments of the present invention would generally use a specific type of indication from one of the many possible indication types. The choice of which indication type to use may be predetermined for a particular computing environment or may be specified by a computing environment user.

In a further exemplary embodiment of the present invention, a user has a remote computer (Personal Data Assistant, laptop, etc.) that is connected via some communication means to a host computer. Examples of these means include but are not limited to a serial bus connection (such as Universal Serial Bus (USB)), a local or wide area network wire line based or wireless connection (such as Ethernet, Code Division Multiplex Access (CDMA)). The remote computer is running an application that a user would like to transfer the visual output of to a host computer. In one embodiment the remote computer and the host computer have an integrated display space and the user of the remote computer transfers the visual output by dragging the application's interface virtually from the remote computer's display to the host computer's display. Because the application is still executing on the remote computer, it displays the application with a slight color tinge to remind the user.

Figure 5:
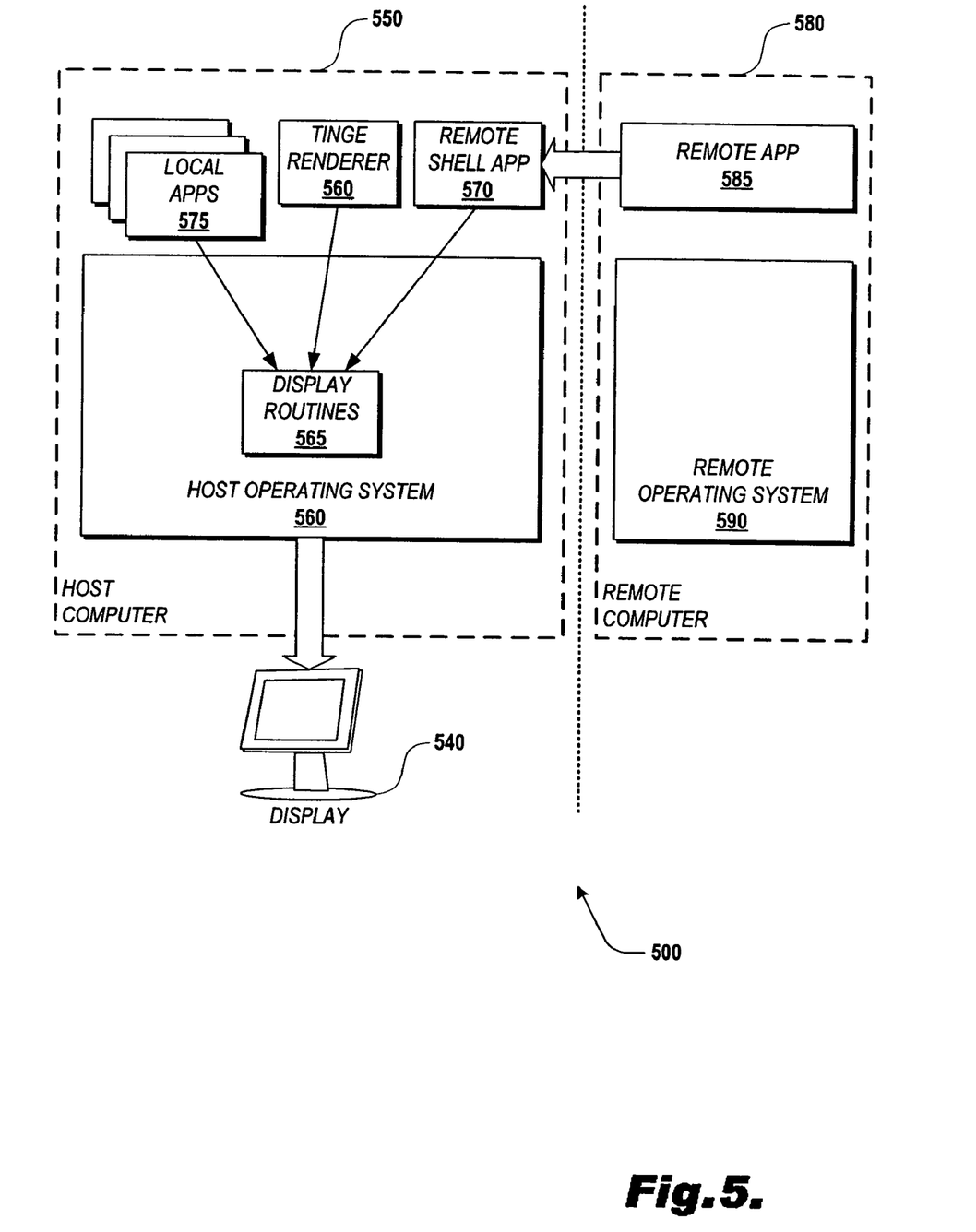
FIG. 5 illustrates a block diagram view of a computing system environment with a host computer coupled with a remote computer, in accordance with an embodiment of the present invention.

In such an embodiment of the present invention applications may execute on one machine but have a window depicted on the display of another machine. FIG. 5 illustrates one exemplary embodiment of the present invention with a remote computer 580 executing an operating system 590 and a remote application 585 that, in turn, is coupled to a remote shell application 570 on a host computer 550. The host computer 550 includes a host operating system 560 that, in turn, has display routines 565. Those of ordinary skill in the art and others will appreciate that many display routines 565 may be used to depict information on a display 540 of the host computer 550, however in one exemplary embodiment of the present invention the DirectDraw display routines of Microsoft Corporation of Redmond, Wash., are used to depict a window of the remote application 580 depicted in cooperation with the remote shell application 570 and the tinge renderer 560. The tinge renderer 560 operates to adjust (e.g., using alpha blending or other appearance altering methods) the display routines 565 such that applications that operate from remote devices such as remote computer 580 are depicted with an altered appearance on the display 540. The host computer may also include local applications 575. Local applications 575 would not have an altered appearance in such an embodiment. Again, tinge renderer 560 may be a hardware or a software component, and it may be combined with another component of host computer 550.

Figure 6:
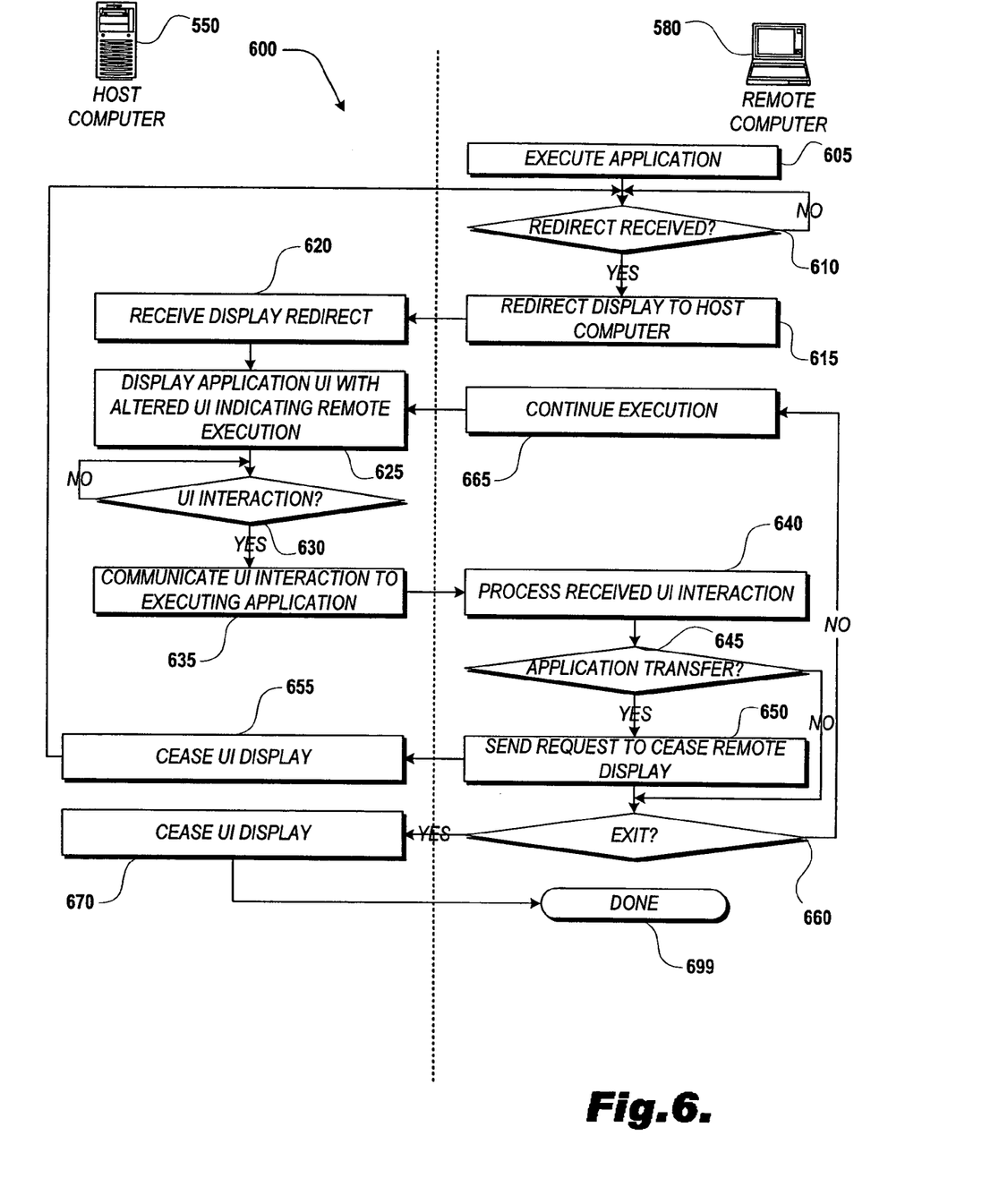
FIG. 6 illustrates a flow diagram between a host computer and a remote computer of a remote application operation routine, in accordance with an embodiment of the present invention.

FIG. 6 illustrates an exemplary flow diagram of the respective communications and operations 600 between a host computer 550 and a remote computer 580 to depict a remotely operating application in an altered manner. Remotely executing application processing flow 600 begins at block 605 where an application is executed on the remote computer 580. In decision block 610 a determination is made by the application whether the application has received a redirection request. If not, processing loops back to decision block 610 until such a request is received. Once a redirect request has been received, processing continues to block 615 where the application's display is redirected to the host computer 550. In block 620 the remote application's redirected display is received. Next, in block 625, the application's user interface (e.g., window) is displayed by remote shell application 570 with an altered user interface (e.g., using alpha blending or other appearance altering methods in conjunction with the tinge renderer 560 and the display routines 565) indicating that it is executing remotely.

Those of ordinary skill in the art will appreciate that many types of altered display may be possible including all of those altered display types described for application windows above. In accordance with one exemplary embodiment of the present invention, each remote computing device is assigned a particular color and applications executing on each respective device have their application windows on the host computer tinged in accordance with each respective color representing the remote device they are actually executing on.

As execution of the remote application continues, processing flow 600 proceeds to decision block 630 where a determination is made whether a user interface interaction has been received. If no user interface action has been received for the remotely operating application's user interface on the host computer 550, processing flow 600 loops back until such a user interface interaction has been received.

Once a user interface interaction has been received for the remotely executing application, processing continues to block 635 where the user interface interaction is communicated to the remotely executing application on the remote computer 580. In block 640 the user interface interaction is processed and processing continues to decision block 645 where a determination is whether there was a request to transfer the application back to the remote computer 580. If so, then in block 650, a request is sent to the host computer 550 to cease the remote display. Next, in block 655, the host computer ceases to display the remotely executing application's user interface. Processing then loops back to decision block 610. If, however, in decision block 645, it was found that there was no request to transfer the application, processing proceeds to decision block 660 where a determination is made whether to exit the remotely executing application. If an exit was desired, processing continues to block 670 where the host computer 550 ceases to display the remotely executing application's user interface and processing returns back to block 699 where processing flow 600 ends. If, however, in decision block 660, it was determined that no exit from the remotely executing application was requested, processing continues back to block 665 where the remotely executing application continues its execution and processing then loops back to block 625 where processing proceeds as described above.

Still further embodiments of the present invention depict incremental state changes in a user interface. A typical user is overflooded with email. Tingeing windows is one ambient mechanism to identify information not immediately discernable. For instance, an email application's window can increasingly become more deeply tinged in red as a person's email in-box fills up.

Figure 7A:
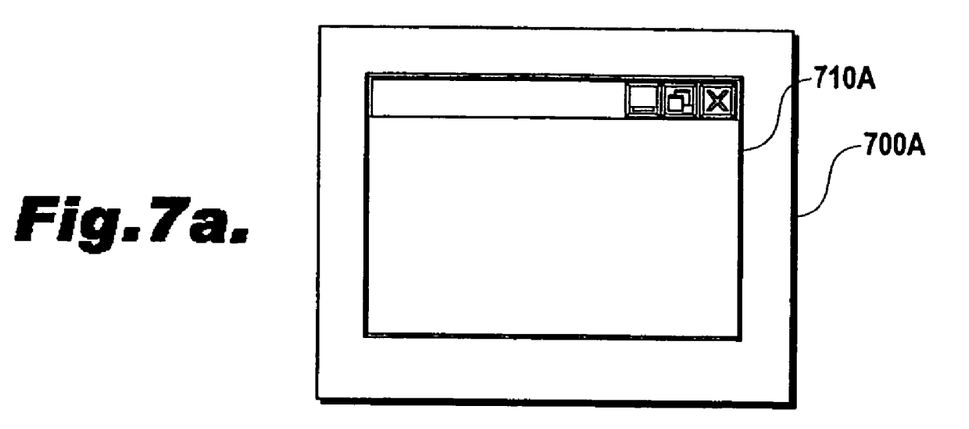
FIGS. 7a-c illustrate exemplary screen shots with an application window having graduated appearance changes, in accordance with an embodiment of the present invention.
Figure 7B:
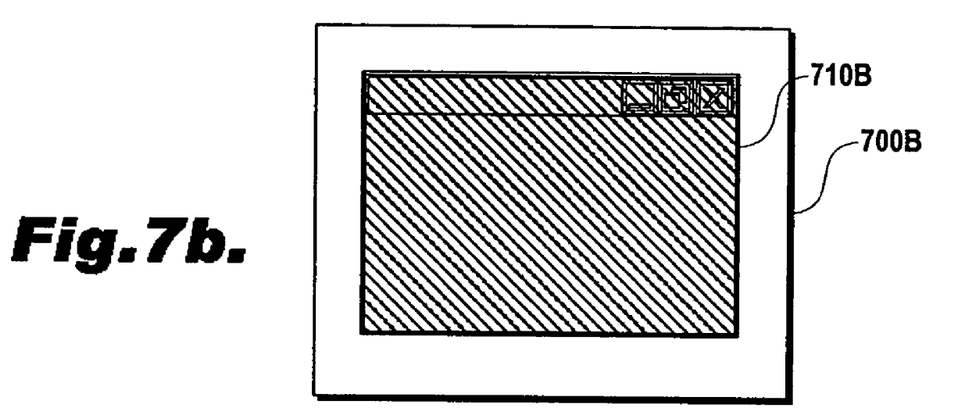
Figure 7C:
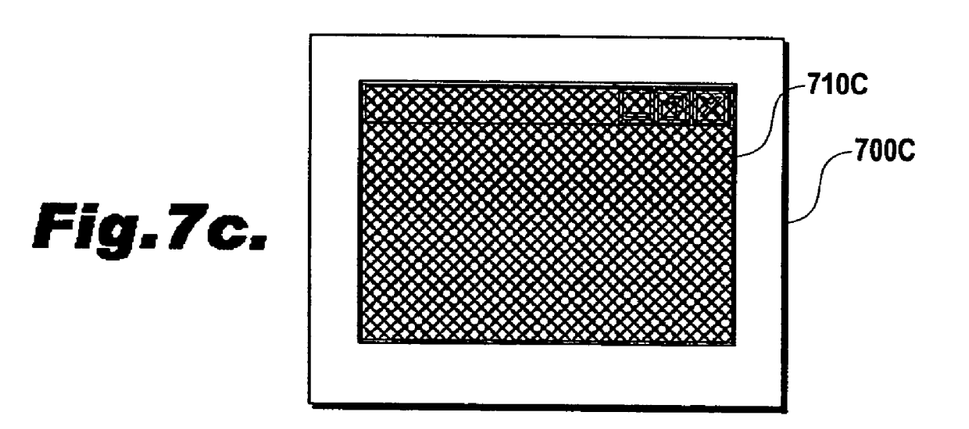

FIGS. 7*a-b* illustrate exemplary screen shots 700A-C in which an application window 710A-C is incrementally changed in appearance (potentially by the application in cooperation with a tinge renderer (not shown)) to reflect changes in the state of the underlying application depicting the application window 710A-C. In one exemplary embodiment of the present invention, the change in appearance of the application window is a change in intensity of a color tinge to the application window. In a further embodiment, the application is an email application and in FIG. 7*a* this email application with a minimal number of unread email messages would have little or no color tinge. As unread email messages accumulate the state of the email application incrementally changes and, accordingly, a corresponding color tinge is introduced into the application window 710B. As still further emails accumulate in the application the tinge would increase in intensity such that in FIG. 7*c* the application window 710C has an intense color tinge indicating that there has been a large incremental change in state in the underlying application.

Those of ordinary skill in the art and others will appreciate that different incremental changes in state can trigger an assortment of levels of appearance changes and that these levels may be predetermined or configured by a user of an operating environment tracking incremental state changes. In one exemplary embodiment of the present invention unread messages of a high priority would cause greater color tingeing increments and/or different shades of color tingeing of the application than messages with a regular or low priority received in an email application.

In other embodiments of the present invention color tingeing may be used to indicate other forms of incremental state changes. For example, in one exemplary embodiment an application undergoing a period of calculation may change its color tinge to correspond with the amount of time remaining on a given calculation. Still other appearance changes may indicate incremental changes in security levels and/or other incremental state changes appreciated by those of ordinary skill in the art and others. It will be appreciated that the above examples are merely illustrative embodiments presented to assist in the understanding of embodiments of the present invention and in no way are meant to limit the scope of the present invention, which is defined by the claims attached hereto.

Figure 8:
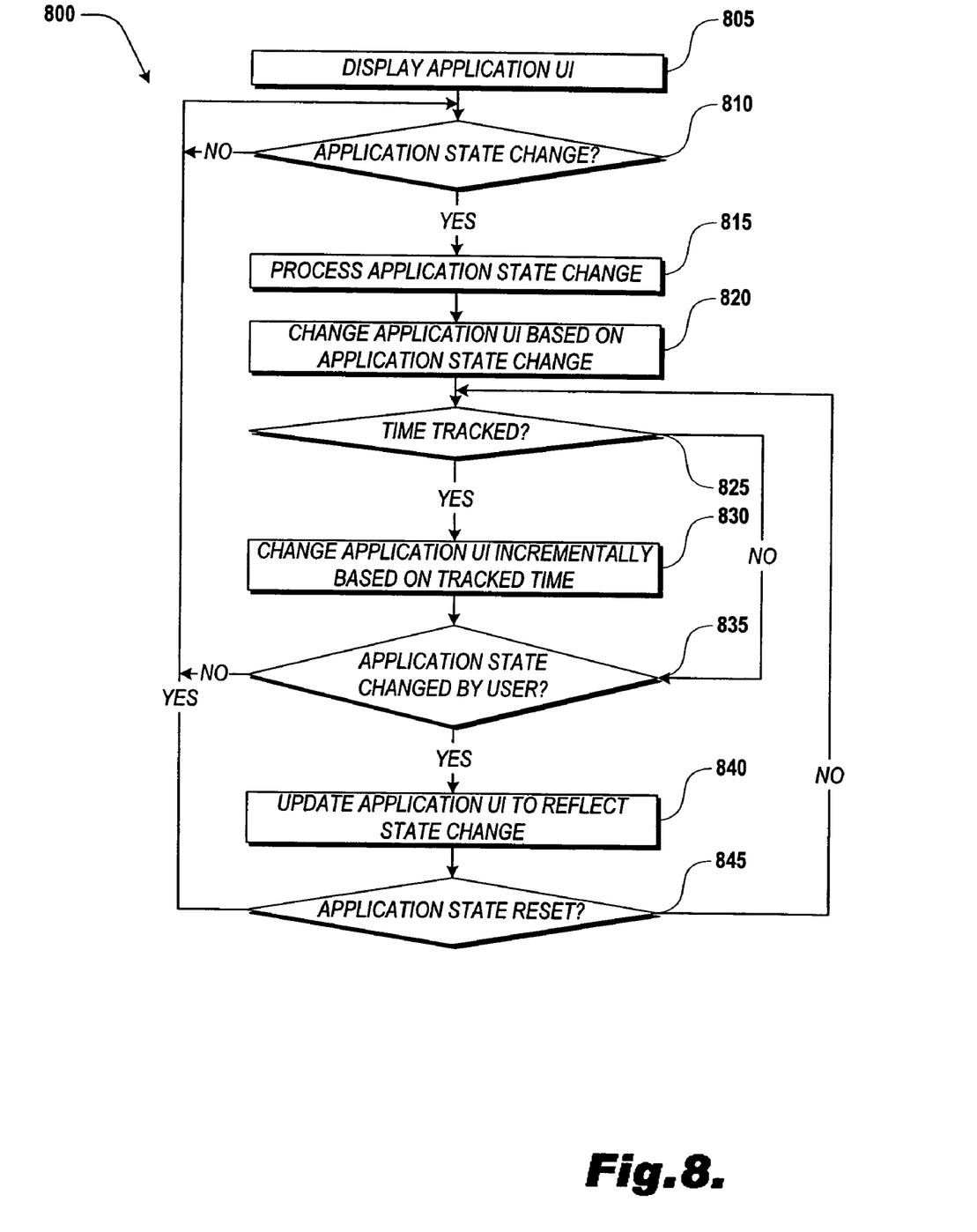
FIG. 8 illustrates a flow diagram of an incremental state change indication routine, in accordance with an embodiment of the present invention.

FIG. 8 illustrates a flow chart depicting one exemplary set of processes for depicting incremental state changes of an application. The incremental state change routine 800 begins at block 805 where an application user interface (e.g., window) is displayed. In decision block 810, a determination is made whether the application state has changed. If not, processing loops back to decision block 810 until an application state change has been detected. Once the application state has changed processing continues to block 815 where the application state change is processed. In block 820 the application user interface is changed based on the application state change (e.g., using alpha blending or other appearance altering methods in conjunction with a tinge renderer). For example, in an email application, once one or more emails have been detected as unread in the in-box the email application window appearance is changed to reflect this new state change. Next, in decision block 825, a determination is made whether time is tracked as an additional modifier of application user interface appearances. In some exemplary embodiments of the present invention, time is tracked as an additional modifier such that if messages in an email application go unread for incremental periods of time the appearance of the email application window will continue to change even if no new messages are received. Accordingly, if in decision block 825 it is determined that time is tracked, processing continues to block 830 where the application user interface is changed incrementally based on a tracked period of time. Processing continues to decision block 835. Likewise, if in decision block 825 it was determined that time is not tracked, processing also continues to decision block 835 where a determination is made whether the user changed an application state.

In accordance with the email application embodiment discussed above, one application state change from a user might be the reading of unread email messages such that they are no longer being tracked as unread email messages. If, however, there was no application state change by the user, processing continues back to decision block 810. Once there is an application state change by the user processing continues on to decision block 840 where the application's user interface is updated to reflect the new state change introduced by the user of the application. Accordingly, continuing the email embodiment from above, if a user reads one or more unread messages the user interface appearance might revert back to an initial setting as the purpose of the appearance change was to bring the user's attention to the email messages and having obviously accomplished that by receiving the user's state change it is no longer necessary to have the changed window appearance.

In an alternate embodiment of the present invention, there is only a decremental state change per message read by the user and, accordingly, an appearance change (such as a color tinge) may persist even after a user has read a portion of the unread email messages.

Next, in decision block 845, a determination is made whether the application state has been reset. If the application state has not been reset, processing continues back to decision block 825. On the other hand, if in decision block 845 it was determined that the application state was reset, the incremental state change routine 800 loops back to decision block 810 and waits until an application state change occurs before altering the application's user interface again.

Although specific embodiments have been illustrated and described herein, it will be appreciated by those of ordinary skill in the art that a wide variety of alternate and/or equivalent implementations may be substituted for the specific embodiments shown and described without departing from the scope of the present invention. In particular, any of the local, remote or host computers referred to earlier may be a "special purpose" processor based computing devices, including but are not limited to, wireless mobile phones, personal digital assistants, tablet computers, laptop computers, set-top box, digital cameras, CD or DVD players, and so forth. This application is intended to cover any adaptations or variations of the embodiments discussed herein. Therefore, it is manifestly intended that this invention be limited only by the claims and the equivalents thereof.

What is claimed is:

1. A computer including:
    a memory, having executable instructions for a computing environment having a user interface, wherein the computing environment comprises an operating system having one or more computer applications being remotely executed on a set of networked hardware resources;
    a tinge renderer capable of adjusting the depiction of said user interface, separately from any other depictions of any other applications of the computer, to denote that the one or more computer applications is being remotely executed;
    a processor, coupled to said memory and said tinge renderer to execute said executable instructions in cooperation with said tinge renderer; and
    a display coupled to said tinge renderer, operative to depict said adjusted user interface.

2. The computer of claim 1, wherein said tinge renderer is a hardware component.

3. The computer of claim 1, wherein said tinge renderer is a software component.

4. The computer of claim 1, wherein the tinge renderer is capable of adjusting the depiction of said user interface such that said user interface associated with the remotely executed one or more computer applications is visually distinguishable from another user interface associated with one or more other computer applications being locally executed on the computer.

5. A method of rendering a tinge to a computing environment, the method comprising:
    determining a state of the computing environment comprising an operating system having one or more computer applications being virtually executed on a set of local hardware resources;
    adjusting a tinge of a user interface of the computing environment, to denote that the one or more computer applications is being virtually executed; and
    depicting an adjusted user interface based on said tinge.

6. The method of claim 5, wherein said tinge is adjusted in part of an operating system.

7. A method of indicating a processing location in a computing environment, the method comprising:
    executing a new computing application having a user interface;
    determining a processing location of said application; and
    displaying said user interface with an indication within said user interface of said processing location.

8. The method of claim 7, wherein said displaying further comprises:
    adjusting a tinge of said user interface, based at least in part on said processing location.

9. The method of claim 7, wherein said location is selected from a virtual machine, processor, processor core, computing device, operating system, geographic location, and network location.

10. A method of indicating graduated state changes in a computer application, the method comprising:
    receiving a first incremental state change for the software application;
    incrementally increasing a color tinge of the computer application proportionately to said first incremental state change;
    receiving a second incremental state change for the software application; and
    incrementally increasing said tinge of said user interface proportionately to said second incremental state change.

11. The method of claim 10, further comprising decreasing said tinge of said user interface in response to a decremental change.

12. A computer readable medium containing computer executable instructions for indicating graduated state changes in a computer application by:
    receiving a first incremental state change for the software application;
    incrementally increasing a color tinge of the computer application proportionately to said first incremental state change;
    tracking a time starting from said incrementally increasing the color tinge proportionately to said first incremental state change; and
    incrementally increasing said tinge of said user interface proportionately to the tracked time.

13. The method of claim 12, wherein the computer application is a communications application and said first incremental state change corresponds to received communications.

* * * * *